US012750080B2

(12) United States Patent
Clemente et al.

(10) Patent No.: US 12,750,080 B2
(45) Date of Patent: Sep. 29, 2026

(54) TRANSMITARRAY ANTENNA CELL

(71) Applicant: Commissariat à l'Energie Atomique et aux Energies Alternatives, Paris (FR)

(72) Inventors: Antonio Clemente, Grenoble (FR); Cedric Dehos, Grenoble (FR); José-Luis Gonzalez Jimenez, Grenoble (FR)

(73) Assignee: Commissariat à l'Energie Atomique et aux Energies Alternatives, Paris (FR)

(*) Notice: Subject to any disclaimer, the term of this patent is extended or adjusted under 35 U.S.C. 154(b) by 230 days.

(21) Appl. No.: 18/441,237

(22) Filed: Feb. 14, 2024

(65) Prior Publication Data

US 2024/0275417 A1 Aug. 15, 2024

(30) Foreign Application Priority Data

Feb. 15, 2023 (FR) ....................................... 2301423

(51) Int. Cl.

| | |
|---|---|
| ***H04B 1/38*** | (2015.01) |
| ***H01Q 3/36*** | (2006.01) |
| ***H01Q 21/24*** | (2006.01) |
| *H04B 1/04* | (2006.01) |
| *H04B 1/3805* | (2015.01) |

(52) U.S. Cl.

CPC ................. *H04B 1/38* (2013.01); *H01Q 3/36* (2013.01); *H01Q 21/24* (2013.01); *H04B 2001/0408* (2013.01); *H04B 2001/3811* (2013.01)

(58) Field of Classification Search

CPC .............. H04B 1/38; H04B 2001/0408; H04B 2001/3811; H01Q 3/36; H01Q 21/24

See application file for complete search history.

(56) References Cited

U.S. PATENT DOCUMENTS

| | | | | |
|---|---|---|---|---|
| 2009/0103593 A1* | 4/2009 | Bergamo | .............. | H04B 7/086 375/E1.002 |
| 2020/0053490 A1* | 2/2020 | Shriner | ................ | H04R 25/554 |

OTHER PUBLICATIONS

Ortiz, Sean, Toni Ivanov, and Amir Mortazawi. "A transmit-receive Spatial amplifier array." In 1997 IEEE MTT-s Internation Microwave Symposium Digest, vol. 2, pp. 679-682. IEEE, 1997. (Year: 1997).*

French Search Report for French Application No. 2301423; dated Sep. 25, 2023; 3 pages.

Ortiz, Sean, Toni Ivanov, and Amir Mortazawi. "A transmit-receive spatial amplifier array." In 1997 IEEE MTT-S International Microwave Symposium Digest, vol. 2, pp. 679-682. IEEE, 1997.

(Continued)

*Primary Examiner* — John J Lee

(74) *Attorney, Agent, or Firm* — Jordan IP Law, LLC

(57) ABSTRACT

The present description concerns a transmitarray cell (105) adapted to implementing a full-duplex communication, the cell comprising: a first antenna element (105*a*) located on a first surface of the cell; a second antenna element (105*b*) located on a second surface of the cell, opposite to the first surface; a transmit channel comprising, between the first and second antenna elements, a first phase-shift and amplifier circuit (203*a*); and a receive channel comprising, between the first and second antenna elements, a second phase-shift and amplifier circuit (203*b*).

15 Claims, 3 Drawing Sheets

(56) References Cited

OTHER PUBLICATIONS

Ortiz, S. C. R. I. I., and A. Mortazawi. "A compact circularly polarized microstrip transmit-receive antenna for LAN applications." In IEEE Antennas and Propagation Society International Symposium. 1998 Digest. Antennas: Gateways to the Global Network. Held in conjunction with: USNC/URSI National Radio Science Meeting (Cat. No. 98CH36, vol. 4, pp. 2104-2107. IEEE, 1998.
Popovic, Zoya, and Amir Mortazawi. "Quasi-optical transmit/receive front ends." IEEE Transactions on microwave Theory and Techniques 46, No. 11 (1998): 1964-1974.
Landsberg, Naftali, and Eran Socher. "Design and measurements of 100 GHz reflectarray and transmitarray active antenna cells." IEEE Transactions on Antennas and Propagation 65, No. 12 (2017): 6986-6997.
Pan, Wenbo, Cheng Huang, Xiaoliang Ma, and Xiangang Luo. "An amplifying tunable transmitarray element." IEEE Antennas and Wireless Propagation Letters 13 (2014): 702-705.
Forman, Michael, James Vian, and Zoya Popovic. "A K-band full-duplex transmit-receive lens array." In 2001 IEEE MTT-S International Microwave Sympsoium Digest (Cat. No. 01CH37157), vol. 3, pp. 1831-1834. IEEE, 2001.
De Kok, Martijn, Cornelis JC Vertegaal, A. Bart Smolders, and Ulf Johannsen. "A 34-to 36-GHz Active Transmitarray for Ka-Band Tracking Radar Using 5G Tx/Rx Beamforming ICs: Design and 64-Element Demonstrator." IEEE Transactions on Antennas and Propagation 71, No. 4 (2023): 3260-3272.
Padilla, Pablo, Alfonso Muñoz-Acevedo, Manuel Sierra-Castañer, and Manuel Sierra-Pérez. "Electronically reconfigurable transmitarray at Ku band for microwave applications." IEEE Transactions on Antennas and Propagation 58, No. 8 (2010): 2571-2579.
Duarte, Melissa, Chris Dick, and Ashutosh Sabharwal. "Experiment-driven characterization of full-duplex wireless systems." IEEE Transactions on Wireless Communications 11, No. 12 (2012): 4296-4307.
Bharadia, Dinesh, Emily McMilin, and Sachin Katti. "Full duplex radios." In Proceedings of the ACM SIGCOMM 2013 conference on SIGCOMM, pp. 375-386. 2013.

* cited by examiner

TRANSMITARRAY ANTENNA CELL

FIELD

The present disclosure generally concerns electronic devices and, more particularly, the field of transmitarray antennas.

BACKGROUND

Among the different existing radio communication antenna technologies, so-called "transmitarray" radio antennas are particularly known. These antennas generally comprise a plurality of elementary cells, each comprising a first antenna element irradiated by an electromagnetic field emitted by one or a plurality of sources, a second antenna element transmitting a modified signal to the outside of the antenna, and a coupling element between the first and second antenna elements.

Existing transmitarray antennas however suffer from various disadvantages.

SUMMARY

There exists a need to improve existing transmitarray antennas. It would in particular be desirable to have transmitarray antennas adapted to implementing a simultaneous bidirectional communication.

For this purpose, an embodiment provides a cell of a transmitarray adapted to implementing a full-duplex communication, the cell comprising:

- a first antenna element located on a first surface of the cell;
- a second antenna element located on a second surface of the cell, opposite to the first surface;
- a transmit channel comprising, between the first and second antenna elements, a first phase-shift and amplifier circuit; and
- a receive channel comprising, between the first and second antenna elements, a second phase-shift and amplifier circuit.

According to an embodiment, the transmit channel is adapted to transmitting a first signal having a first polarization state, and the receive channel is adapted to receiving a second signal having a second polarization state, different from the first polarization state.

According to an embodiment, the first and second signals have orthogonal linear polarizations.

According to an embodiment, the first and second signals have circular and linear polarizations, respectively.

According to an embodiment, each of the first and second antenna elements comprises a substantially square-shaped conductive plane and first and second ports respectively located in the vicinity of first and second adjacent sides of the conductive plane.

According to an embodiment, the first and second ports of the first antenna element are respectively located vertically in line with the first and second ports of the second antenna element.

According to an embodiment, the first and second ports of the first antenna element are respectively coupled, by the first and second phase-shift and amplifier circuits, to the first and second ports of the second antenna element.

According to an embodiment, the first and second ports of the first antenna element are respectively coupled, by the first and second phase-shift and amplifier circuits, to the second and first ports of the second antenna element.

According to an embodiment, the cell further comprises first and second ground planes interposed between the first antenna element and the second antenna element.

According to an embodiment, the first and second phase-shift and amplifier circuits are interposed between the first and second ground planes.

According to an embodiment, the first and second antenna elements and the first and second ground planes are formed in conductive levels of a printed circuit board.

According to an embodiment, the transmit and receive channels each comprise a phase-shift circuit and an amplifier circuit series-connected between the first antenna element and the second antenna element.

An embodiment provides a transmitarray comprising a plurality of cells such as described.

According to an embodiment, the first antenna element of each cell is electrically isolated from the first antenna element of each of the other cells, and the second antenna element of each cell is electrically isolated from the second antenna element of each of the other cells.

An embodiment provides an antenna comprising a transmitarray such as described and at least one source configured to irradiate a surface of the array.

BRIEF DESCRIPTION OF THE DRAWINGS

The foregoing features and advantages, as well as others, will be described in detail in the rest of the disclosure of specific embodiments given by way of illustration and not limitation with reference to the accompanying drawings, in which.

DETAILED DESCRIPTION OF THE PRESENT EMBODIMENTS

Like features have been designated by like references in the various figures. In particular, the structural and/or functional features that are common among the various embodiments may have the same references and may dispose identical structural, dimensional and material properties.

For the sake of clarity, only the steps and elements that are useful for the understanding of the described embodiments have been illustrated and described in detail. In particular, embodiments of an elementary cell for a transmitarray antenna are described hereafter. The structure and the operation of the primary source(s) of the antenna, intended to irradiate the transmitarray, will however not be detailed, the described embodiments being compatible with all or most known primary irradiation sources for transmitarray antennas. As an example, each primary source is adapted to generating a beam of generally conical shape irradiating all or part of the transmitarray. Each primary source comprises, for example, a horn antenna. As an example, the central axis of each primary source is substantially orthogonal to the mean plane of the array.

Further, the methods for manufacturing the described transmit arrays will not be detailed, the forming of the described structures being within the abilities of those skilled in the art based on the indications of the present disclosure, for example by implementing usual printed circuit manufacturing techniques.

Unless indicated otherwise, when reference is made to two elements connected together, this signifies a direct connection without any intermediate elements other than conductors, and when reference is made to two elements coupled together, this signifies that these two elements can be connected or they can be coupled via one or a plurality of other elements.

In the following description, when reference is made to terms qualifying absolute positions, such as terms "front", "back", "top", "bottom", "left", "right", etc., or relative positions, such as terms "above", "under", "upper", "lower", etc., or to terms qualifying directions, such as terms "horizontal", "vertical", etc., it is referred, unless specified otherwise, to the orientation of the drawings.

Unless specified otherwise, the expressions "about", "approximately", "substantially", and "in the order of" signify plus or minus 10%, preferably of plus or minus 5%.

Figure 1:
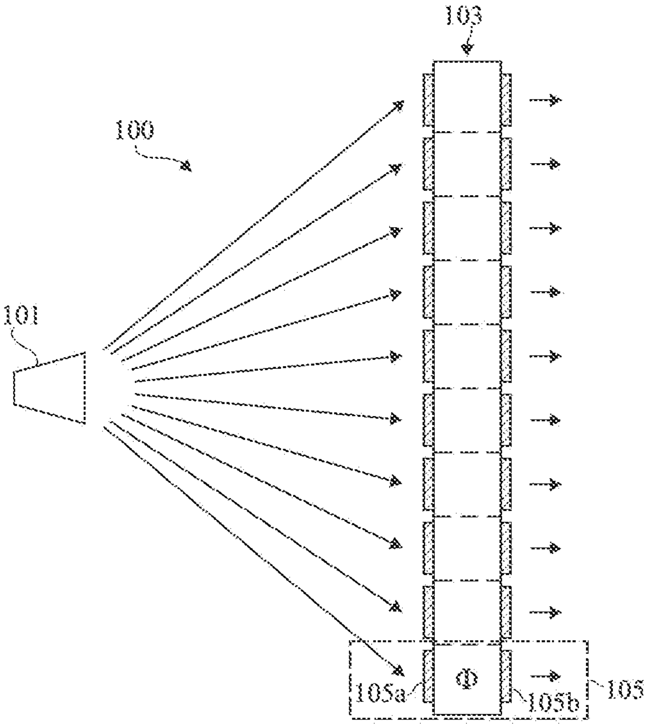
FIG. 1 is a simplified and partial side view of an example of a transmitarray antenna of the type to which described embodiments apply as an example.

FIG. 1 is a simplified and partial side view of an example of a transmitarray antenna 100 of the type to which described embodiments apply as an example.

Antenna 100 typically comprises one or a plurality of primary sources 101 (a single source 101, in the shown example) irradiating a transmitarray 103. Source 101 may have any polarization, for example linear or circular. Array 103 comprises a plurality of elementary cells 105, for example arranged in an array of rows and columns. Each cell 105 typically comprises a first antenna element 105*a*, located on the side of a first surface of array 103 arranged in front of primary source 101, and a second antenna element 105*b*, located on the side of a second surface of the array opposite to the first surface. The second surface of array 103 for example faces a transmitting medium, or outside environment, of antenna 100.

Each cell 105 is capable, in transmit mode, of receiving an electromagnetic radiation on its first antenna element 105*a* and of transmitting back this radiation from its second antenna element 105*b*, for example by introducing a known phase shift $\phi$. In receive mode, each cell 105 is capable of receiving an electromagnetic radiation on its second antenna element 105*b* and of transmitting back this radiation from its first antenna element 105*a*, towards source 101, with the same phase shift $\phi$. The radiation transmitted back by the first antenna element 105*a* is, for example, focused on source 101.

The characteristics of the near-field or far-field radiation generated by antenna 100, in particular its shape (or gauge), its intensity and its maximum transmission direction (or pointing direction), depend on the values of the phase shifts respectively introduced by the various cells 105 of array 103.

Transmitarray antennas have the advantages, among others, of having a good power efficiency and of being relatively simple, inexpensive, and compact. This is in particular due to the fact that transmit arrays are implementable in planar technology, generally on a printed circuit.

The present disclosure more particularly concerns reconfigurable transmitarray antennas 103. Transmitarray 103 is said to be reconfigurable when elementary cells 105 are individually electronically controllable to modify their phase shift value $\phi$ and/or their amplitude, which enables to dynamically modify the characteristics of the radiation generated by the antenna, and in particular to modify its pointing direction without mechanically moving the antenna or a portion of the antenna by means of a motorized element.

Figure 2:
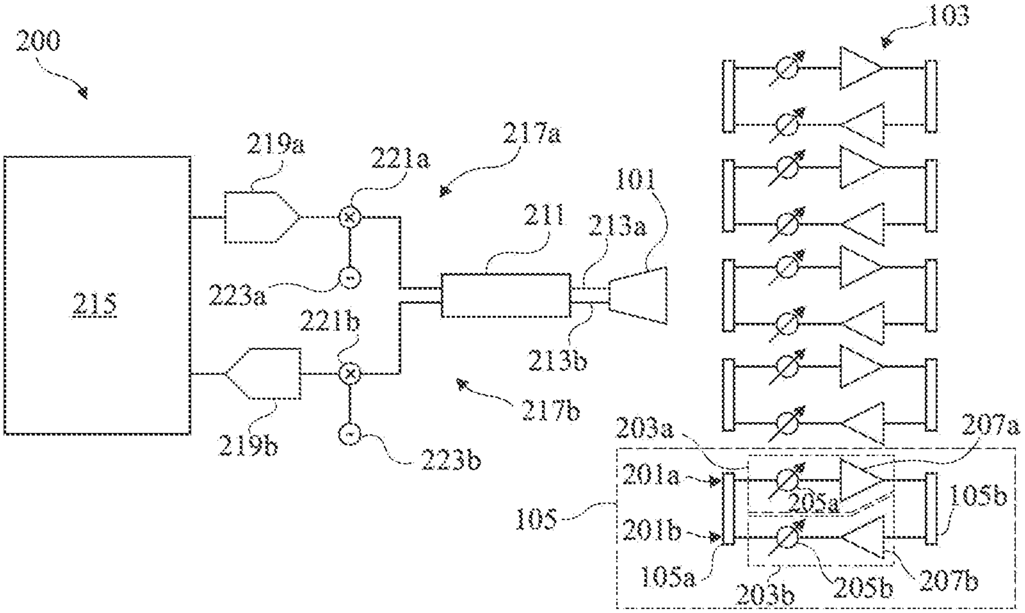
FIG. 2 is a simplified and partial side view of an example of a transmitarray antenna according to an embodiment.

FIG. 2 is a simplified and partial side view of an example of a transmitarray antenna 200 according to an embodiment. The antenna 200 of FIG. 2 has elements in common with the antenna 100 of FIG. 1. These common elements will not be detailed again hereafter.

In the shown example, each elementary cell 105 of transmitarray 103 comprises a transmit channel 201*a* and a receive channel 201*b* respectively intended to transmit and to receive signals, for example simultaneously. Within each cell 105, each channel 201*a*, 201*b* couples the first antenna element 105*a* to the second antenna element 105*b* of the cell. In the shown example, for each cell 105, the first antenna element 105*a* connects a first end of transmit channel 201*a* to a first end of receive channel 201*b*. Similarly, the second antenna element 105*b* of cell 105 connects a second end of transmit channel 201*a*, opposite to the first end of channel 201*a*, to a second end of receive channel 201*b*, opposite to the first end of channel 201*b*. Further, the first antenna element 105*a* of each elementary cell 105 is electrically isolated from the first antenna element 105*a* of each of the other cells 105, and the second antenna element 105*b* of each elementary cell 105 is electrically isolated from the second antenna element 105*b* of each of the other cells 105.

Each transmit channel 201*a* comprises a phase-shift and amplifier circuit 203*a*, and each receive channel 201*b* comprises a phase-shift and amplifier circuit 203*b*. In the shown example, each phase-shift and amplifier circuit 203*a*, 203*b* comprises, between the first and second antenna elements 105*a* and 105*b*, a phase-shift circuit 205*a*, 205*b* associated in series with an amplifier circuit 207*a*, 207*b*.

The phase-shift circuit 205*a* of transmit channel 201*a* comprises a terminal coupled, preferably connected, to the first antenna element 105*a* and another terminal coupled, preferably connected, to a terminal, for example an input terminal, of amplifier circuit 207*a*, amplifier circuit 207*a* further comprising another terminal, for example an output terminal, coupled, preferably connected, to the second antenna element 105*b*. Further, the amplification circuit 270*b* of receive channel 201*b* comprises a terminal, for example an input terminal, coupled, preferably connected, to the second antenna element 105*b* and another terminal, for example an output terminal, coupled, preferably connected, to a terminal of phase-shift circuit 205*b*, phase-shift circuit 205*b* further comprising another terminal coupled, preferably connected, to the first antenna element 105*a*.

As an example, each phase-shift circuit 205*a*, 205*b* comprises at least one element selected from among a diode, for example a PIN diode, a microelectromechanical system, a varicap or varactor diode, an integrated phase-shift circuit, etc. Each phase-shift circuit 205*a*, 205*b*, for example, receives a control signal originating from a control circuit (not shown in FIG. 2), for example a microcontroller, adapted to switching the signals transmitted by each circuit 205*a*, 205*b* between two distinct phase states.

The amplifier circuit 207*a* of transmit channel 201*a* is, for example, a power amplifier, for example a Class-A linear amplifier in CMOS (Complementary Metal-Oxide-Semiconductor) SOI (Silicon On Insulator) technology, for example of the type described in the article by A. Hamani, A. Siligaris, B. Blampey, and J. L. G. Jimenez entitled "167-GHz and 155-GHz High Gain D-band Power Amplifiers in CMOS SOI 45-nmos", from the fifteenth European Microwave Integrated Circuits Conference (EuMIC) in Utrecht, Netherlands, 2021, pages 261-264.

The amplification circuit 207*b* of receive channel 201*b* is, for example, a low-noise amplifier (LNA). This enables to optimize the noise figure of receive channel 201*b*. As an example, each amplifier circuit 207*b* comprises a class-"AB" amplifier for example comprising one or two operating stages. Each amplifier circuit 207*b* for example has an electrical power in the range from 10 to 20 mW.

In the shown example, the source 101 of transmitarray antenna 200 is connected to an interference canceller circuit 211. More specifically, in this example, first and second links 213*a* and 213*b*, electrically isolated from each other, connect circuit 211 to source 101.

Antenna 200 also comprises a processing circuit 215 connected to circuit 211. In the shown example, circuit 215 is connected to circuit 211 by a transmit channel 217*a* comprising a digital-to-analog converter 219*a* associated in series with a mixer 221*a* (x). Circuit 211 is further coupled to circuit 215 by a receive channel 217*b* comprising a mixer 221*b* (x) associated in series with an analog-to-digital converter 219*b*. Each mixer 221*a*, 221*b* is connected to an oscillator 223*a*, 223*b* (~), for example a voltage-controlled oscillator (VCO) or a phase-locked loop (PLL).

In the shown example, the digital-to-analog converter 219*a* of transmit channel 217*a* has input and output terminals respectively connected to circuit 215 and to a terminal of mixer 221*a*, mixer 221*a* further having another terminal connected to circuit 211. Further, in this example, the mixer 221*b* of receive channel 217*b* comprises a terminal connected to circuit 211 and another terminal connected to an input terminal of an analog-to-digital converter 219*b*, analog-to-digital converter 219*b* further comprising an output terminal connected to circuit 215.

As an example, circuit 215 is adapted to encoding and to modulating a signal to be transmitted by transmit channel 217*a*, and to demodulating and to decoding a signal received by receive channel 217*b*.

Antenna 200 is configured to implement a full-duplex communication, that is, antenna 200 can transmit and receive signals simultaneously in a same frequency band ("In-Band Full-Duplex"—IBFD). In particular, antenna 200 differs from frequency division multiple access (FDMA) antennas, which have transmit and receive channels with separated frequencies. A first signal to be transmitted is for example generated by circuit 215 and then transmitted, via transmit channel 217*a* and first link 213*a*, to source 101 irradiating array 103. The first signal then reaches the first antenna elements 105*a* of the cells 105 of array 103 and is then transmitted, via transmit channels 201*a*, to the second antenna elements 105*b* to be radiated towards the outside environment. At the same time, a second signal to be received from the outside environment is, for example, picked up by the second antenna elements 105*b* of the cells 105 of array 103 and then transmitted, via receive channels 201*b*, to the first antenna elements 105*a*. The second signal is then radiated towards source 101 and is then transmitted, via second link 213*b* and receive channel 217*b*, to circuit 215 in order to be processed.

In transmit mode, the first antenna element 105*a* receives the signal radiated by antenna 101. The signal is then phase-shifted and amplified by transmit channel 201*a*, more precisely by phase-shift circuit 205*a* and by amplification circuit 207*a*, respectively, and then transmitted back by the second antenna element 105*b* towards the outside environment. In receive mode, the second antenna element 105*b* receives the signal from the outside environment. The signal is then amplified and phase-shifted by receive channel 201*b*, more precisely by amplifier circuit 207*b* and by phase-shift circuit 205*b*, respectively, and then transmitted back by the first antenna element to source 101.

The signals transmitted and received by antenna 200 respectively have distinct first and second polarization states or directions. As an example, the transmitted and received signals have first and second linear polarizations orthogonal to each other, the first polarization for example being a linear polarization called "vertical" and the second polarization a linear polarization called "horizontal".

As a variant, at least one of the first and second polarizations may be a circular polarization. In this case, the first and second polarizations may be circular polarizations in opposite directions, the first polarization being, for example, a "left-hand" circular polarization (counter-clockwise, from the point of view of source 101) and the second polarization being, for example, a "right-hand" circular polarization (clockwise, from the point of view of source 101), or the first polarization being a circular polarization and the second polarization being a linear polarization. The fact of providing for the signals transmitted and received by the antenna to respectively have circular and linear polarizations advantageously enables to obtain a better separation of these signals.

In FIG. 2, a single source 101 has been illustrated. Source 101 is, for example, a so-called "bipolarization" source, capable of transmitting and receiving signals with two distinct polarizations respectively. As a variant, source 101 may be replaced by spatially separated first and second sources, the first source being for example adapted to transmitting signals having a first polarization and the second source being adapted to receiving signals having a second polarization, different from the first polarization. In this case, circuit 211 is connected to the first and second sources by first and second links 213*a* and 213*b*, respectively.

An advantage of the antenna 200 of FIG. 2 lies in the fact that it enables to achieve a performance higher, particularly in terms of interference cancellation, than existing antennas.

Figure 3A:
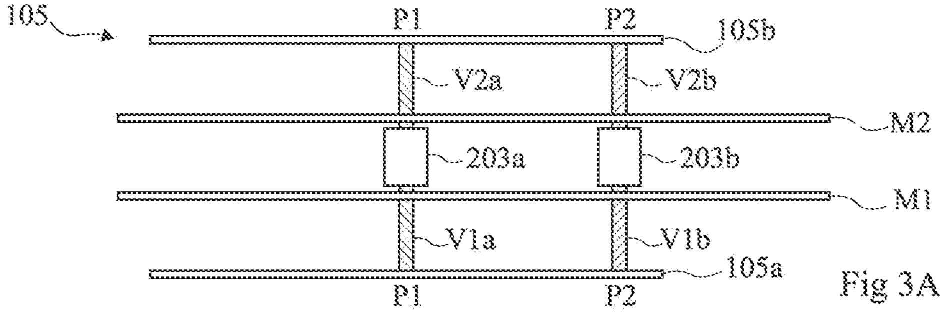
FIG. 3A is a simplified and partial side view of an example of a transmitarray cell according to an embodiment.

FIG. 3A is a simplified and partial side view of the cell 105 of transmitarray 103 according to an embodiment.

In the shown example, cell 105 comprises two separate ground planes M1 and M2 substantially parallel to each other and interposed between the first and second antenna elements 105*b*. The first and second antenna elements 105*a* and 105*b* are, in this example, substantially parallel to each other and to ground planes M1 and M2. In the shown example, circuits 203*a* and 203*b* are interposed between ground planes M1 and M2.

In the example shown in FIG. 3A, phase-shift and amplifier circuit 203*a* is connected, by a conductive via V1*a*, to a first conduction port or terminal P1 of the first antenna element 105*a*. Circuit 203*a* is further connected, by another conductive via V2*a*, to a first conduction port or terminal P1 of the second antenna element 105*b*. Similarly, phase-shift and amplifier circuit 203*b* is connected, by a conductive via V2*a*, to a second conduction port or terminal P2 of the first antenna element 105*a*. Circuit 203*b* is also connected, via another conductive via V2*b*, to a second conduction port or terminal P2 of the second antenna element 105*b*.

As an example, the first and second antenna elements 105*a* and 105*b* and ground planes M1 and M2 are formed in conductive levels or metallization levels of a printed circuit board (PCB), the conductive levels being separated from one another by insulating levels, not shown in FIG. 3A. Circuits 203*a* and 203*b* are for example made in CMOS or BiCMOS (Bipolar Complementary Metal Oxide Semiconductor) technology. As an example, circuits 203*a* and 203*b* may be implemented in discrete or integrated components. Further, an integrated circuit connected to a plurality of antennas may be provided.

Figure 3B:
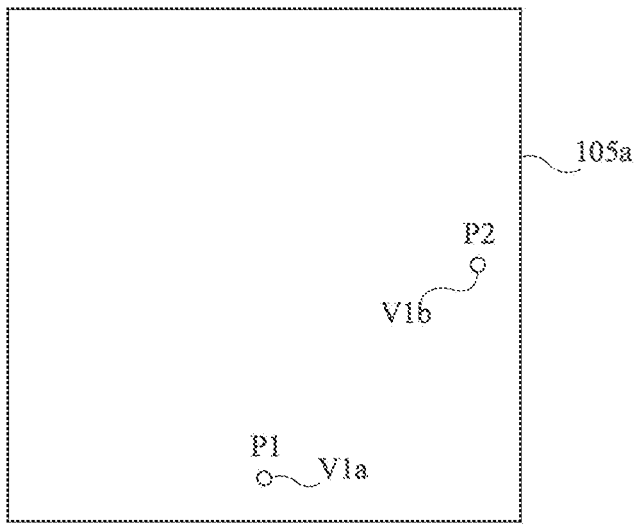
FIG. 3B is a simplified and partial top view of an example of an antenna element of the cell of FIG. 3A.

FIG. 3B is a simplified and partial top view of the first antenna element 105*a* of the cell 105 of FIG. 3A.

In the shown example, the first antenna element 105*a* is a patch antenna comprising a substantially square conductive plane having vias V1*a* and V1*b* connected thereto via ports P1 and P2, respectively. This example is however not limiting, and the conductive plane of the first antenna element 105*a* may have any shape, for example rectangular. In the shown example, port P1 is located in the vicinity of a first side of the square formed by the conductive plane and port P2 is located in the vicinity of a second side of the square adjacent to the first side. In this example, ports P1 and P2 are substantially aligned with the middles of the first and second sides, respectively.

In the shown example, the first antenna element 105*a* is adapted to transmitting, via port P1, a first signal having a linear polarization (a horizontal polarization, in the orientation of FIG. 3B). In this example, the first antenna element 105*a* is further adapted to transmitting towards source 101, from port P2, a second signal having a linear polarization orthogonal to that of the first signal (a vertical polarization, in the orientation of FIG. 3B).

Although this has not been shown in the drawings, the second antenna element 105*b* is, for example, similar or identical to the first antenna element 105*a*. As an example, the ports P1 and P2 of the second antenna element 105*b* are located respectively vertically in line with the ports P1 and P2 of the first antenna element 105*a*. In this case, vias V2*a* and V2*b* are, for example, located respectively vertically in line with vias V1*a* and V1*b*.

Figure 3C:
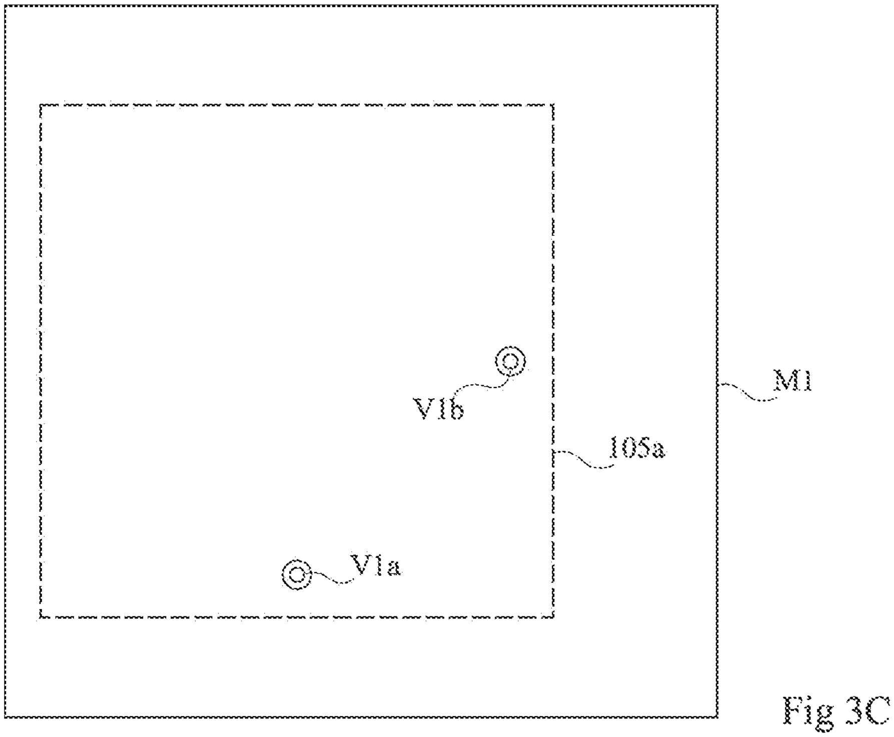
FIG. 3C is a simplified and partial top view of an example of a ground plane of the cell of FIG. 3A.

FIG. 3C is a simplified and partial top view of the ground plane M1 of the cell 105 of FIG. 3A.

In the shown example, vias V1*a* and V1*b* are electrically isolated from ground plane M1. Similarly, vias V2*a* and V2*b* are for example electrically isolated from ground plane M2, ground plane M2 being for example similar or identical to ground plane M1.

Figure 4A:
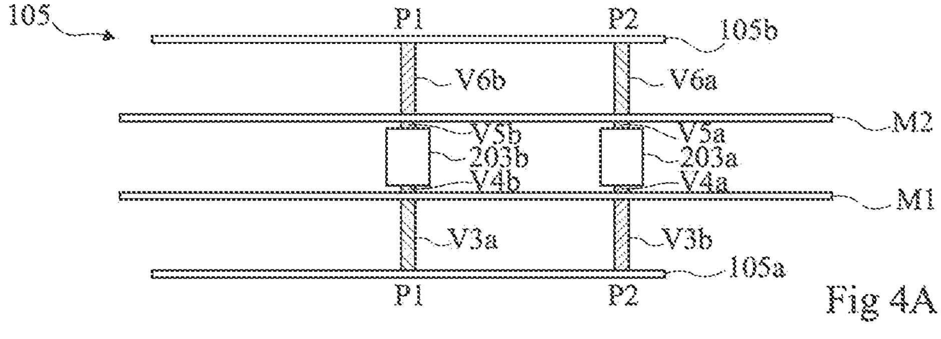
FIG. 4A is a simplified and partial side view of an example of a transmitarray cell according to an embodiment.

FIG. 4A is a simplified and partial side view of cell 105 according to another embodiment. The embodiment of FIG. 4A differs from that of FIG. 3A in that, in the embodiment of FIG. 4A, the first port P1 of the first antenna element 105*a* is coupled to the second port P2 of the second antenna element 105*b*, and the second port P2 of the first antenna element 105*a* is coupled to the first port P1 of the second antenna element 105*b*.

Figure 4B:
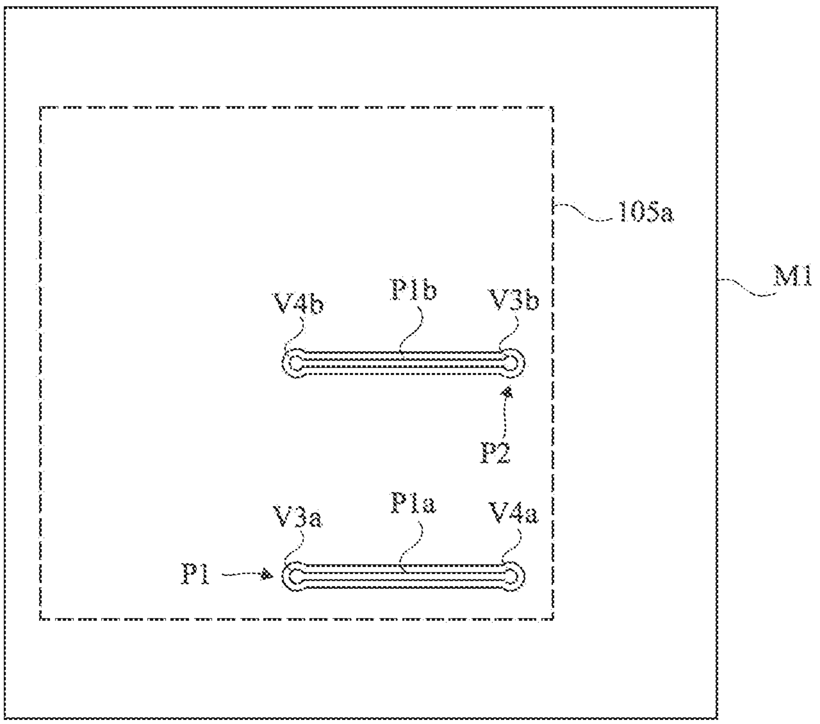
FIG. 4B is a simplified and partial top view of an example of a ground plane of the cell of FIG. 4A.
Figure 4C:
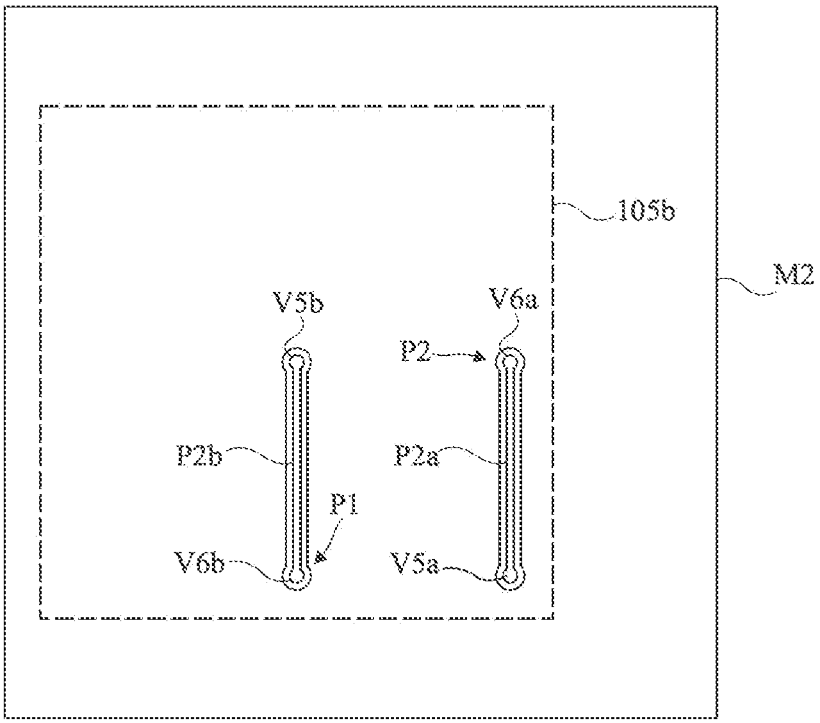
FIG. 4C is a simplified and partial top view of an example of another ground plane of the cell of FIG. 4A.

FIG. 4B is a simplified and partial top view of the ground plane M1 of the cell 105 of FIG. 4A, and FIG. 4C is a simplified partial top view of the ground plane M2 of the cell 105 of FIG. 4A.

In the shown example, cell 105 more precisely comprises:

- a via V3*a* connecting the first port P1 of the first antenna element 105*a* to a first end of a conductive track P1*a*, track P1*a* being for example formed in the same conductive level as ground plane M1 and electrically isolated from ground plane M1;
- a via V4*a* connecting a second end of track P1*a*, opposite to the first end of track P1*a*, to circuit 203*a;*
- a via V5*a* connecting circuit 203*a* to a first end of a conductive track P2*a*, track P2*a* being for example formed in the same conductive level as ground plane M2 and electrically isolated from ground plane M2; and
- a via V6*a* connecting a second end of track P2*a*, opposite to the first end of track P2*a*, to the second port P2 of the second antenna element 105*b*.

Although this has not been detailed in the drawings to avoid overloading the drawing, cell 105 may further comprise one or a plurality of layers ("Redistribution Layers"—RDL) of redistribution of the transmitted and received radio frequency signals, of a ground signal, and of a power supply signal.

Similarly, cell 105 further comprises:

- a via V3*b* connecting the second port P2 of the first antenna element 105*a* to a first end of a conductive track P1*b*, track P1*b* being for example formed in the same conductive level as ground plane M1 and electrically isolated from ground plane M1;
- a via V4*b* connecting a second end of track P1*b*, opposite to the first end of track P1*b*, to circuit 203*b;*
- a via V5*b* connecting circuit 203*b* to a first end of a conductive track P2*b*, track P2*b* being for example formed in the same conductive level as ground plane M2 and electrically isolated from ground plane M2; and
- a via V6*b* connecting a second end of track P2*b*, opposite to the first end of track P2*b*, to the first port P1 of the second antenna element 105*b*.

In the shown example, tracks P1*a* and P1*b* are substantially parallel to each other, and tracks P2*a* and P2*b* are substantially parallel to each other and orthogonal to tracks P1*a* and P1*b*.

An advantage of the embodiment of cell 105 described above in relation with FIGS. 4A to 4C lies in the fact that it enables to further decrease or cancel interferences between the signals transmitted and received by the antenna. As an example, the isolation of the cell 105 of FIGS. 4A to 4C is improved by a factor two, in decibels (dB), as compared with that of the cell 105 of FIGS. 3A to 3B.

Various embodiments and variants have been described. Those skilled in the art will understand that certain features of these various embodiments and variants may be combined, and other variants will occur to those skilled in the art. In particular, the embodiment of cell 105 detailed hereabove in relation with FIGS. 4A to 4C is not limited to the described structure, and other cell 105 structures may be provided by those skilled in the art, based on the indications of the present disclosure, to couple the ports P1 and P2 of the first antenna element 105*a* to the ports P2 and P1, respectively, of the second antenna element 105*b*. Further, those skilled in the art are capable of adapting the structure of cell 105, in particular of the first and second antenna elements 105*a* and 105*b*, to the case where the polarization of the signal to be transmitted and/or of the signal received by antenna 200 has a polarization different from a linear polarization, for example a circular polarization.

Finally, the practical implementation of the described embodiments and variants is within the abilities of those skilled in the art based on the functional indications given hereabove. In particular, the practical forming of the amplifier and phase-shift circuits 203*a* and 203*b* of transmit and receive channels 201*a* and 201*b* is within the abilities of those skilled in the art based on the indications of the present disclosure.

What is claimed is:

1. Cell of a transmitarray adapted to implementing a full-duplex communication, the cell comprising:

a first antenna element located on a first surface of the cell and configured to be located in front of at least one primary source;

a second antenna element located on a second surface of the cell, opposite to the first surface;

a transmit channel comprising, between the first and second antenna elements, a first phase-shift and amplifier circuit; and a receive channel comprising, between the first and second antenna elements, a second phase-shift and amplifier circuit, wherein the first and second antenna elements are formed in conductive levels of a printed circuit board and wherein the first and second phase-shift and amplifier circuits are interposed between the first and second antenna elements.

2. Cell according to claim 1, wherein the transmit channel is adapted to transmitting a first signal having a first polarization state, and the receive channel is adapted to receiving a second signal having a second polarization state, different from the first polarization state.

3. Cell according to claim 2, wherein the first and second signals have orthogonal linear polarizations.

4. Cell according to claim 2, wherein the first and second signals have circular and linear polarizations, respectively.

5. Cell according to claim 1, wherein each of the first and second antenna elements comprises a substantially square-shaped conductive plane and first and second ports respectively located in the vicinity of adjacent first and second sides of the conductive plane.

6. Cell according to claim 5, wherein the first and second ports of the first antenna element are respectively located vertically in line with the first and second ports of the second antenna element.

7. Cell according to claim 5, wherein the first and second ports of the first antenna element are respectively coupled, by the first and second phase-shift and amplifier circuits, to the first and second ports of the second antenna element.

8. Cell according to claim 5, wherein the first and second ports of the first antenna element are respectively coupled, by the first and second phase-shift and amplifier circuits, to the second and first ports of the second antenna element.

9. Cell according to claim 1, further comprising first and second ground planes interposed between the first antenna element and the second antenna element.

10. Cell according to claim 9, wherein the first and second phase-shift and amplifier circuits are interposed between the first and second ground planes.

11. Cell according to claim 9, wherein the first and second ground planes are formed in conductive levels of a printed circuit board.

12. Cell according to claim 1, wherein the transmit and receive channels each comprise a phase-shift circuit and an amplifier circuit series-connected between the first antenna element and the second antenna element.

13. Transmitarray comprising a plurality of cells according to claim 1.

14. Array according to claim 13, wherein the first antenna element of each cell is electrically isolated from the first antenna element of each of the other cells, and the second antenna element of each cell is electrically isolated from the second antenna element of each of the other cells.

15. Antenna comprising a transmitarray according to claim 13 and at least one source configured to irradiate a surface of the array.

* * * * *